United States Patent [19]

Hosseini

[11] Patent Number: 5,822,691

[45] Date of Patent: Oct. 13, 1998

[54] METHOD AND SYSTEM FOR DETECTION OF FRAUDULENT CELLULAR TELEPHONE USE

[75] Inventor: Walid Hosseini, San Diego, Calif.

[73] Assignee: Nokia Mobile Phones Limited, Salo, Finland

[21] Appl. No.: 641,841

[22] Filed: May 2, 1996

[51] Int. Cl.[6] ............................. H04Q 7/00; H04Q 7/38
[52] U.S. Cl. ............................. 455/410; 455/411
[58] Field of Search ............................. 455/410, 411, 455/403, 551, 418, 419; 340/825.31, 825.34, 825.44, 825.5

[56] References Cited

U.S. PATENT DOCUMENTS

| | | | |
|---|---|---|---|
| 5,420,908 | 5/1995 | Hodges et al. | 455/411 |
| 5,457,737 | 10/1995 | Wen | 455/410 |
| 5,734,978 | 3/1998 | Hayatake et al. | 455/410 |

*Primary Examiner*—William Cunning
*Assistant Examiner*—Tracy M. Legree
*Attorney, Agent, or Firm*—Perman & Green, LLP

[57] ABSTRACT

A system to detect the use of stolen mobile identification number (MIN) and electronic serial number (ESN) information to fraudulently place wireless calls by comparing the last phone number connected (LNC) as recorded by the radio telephone network with the last phone number connected as recorded in the mobile radio telephone unit. The mobile radio telephone unit LNC is transmitted to the base station upon initiation of a radio telephone call for comparison with the LNC recorded by the radio telephone network. The network will detect if a MIN/ESN combination is in use by two different mobile units because the LNC of the two mobile units will be different due to the different phone numbers called by each user.

8 Claims, 2 Drawing Sheets

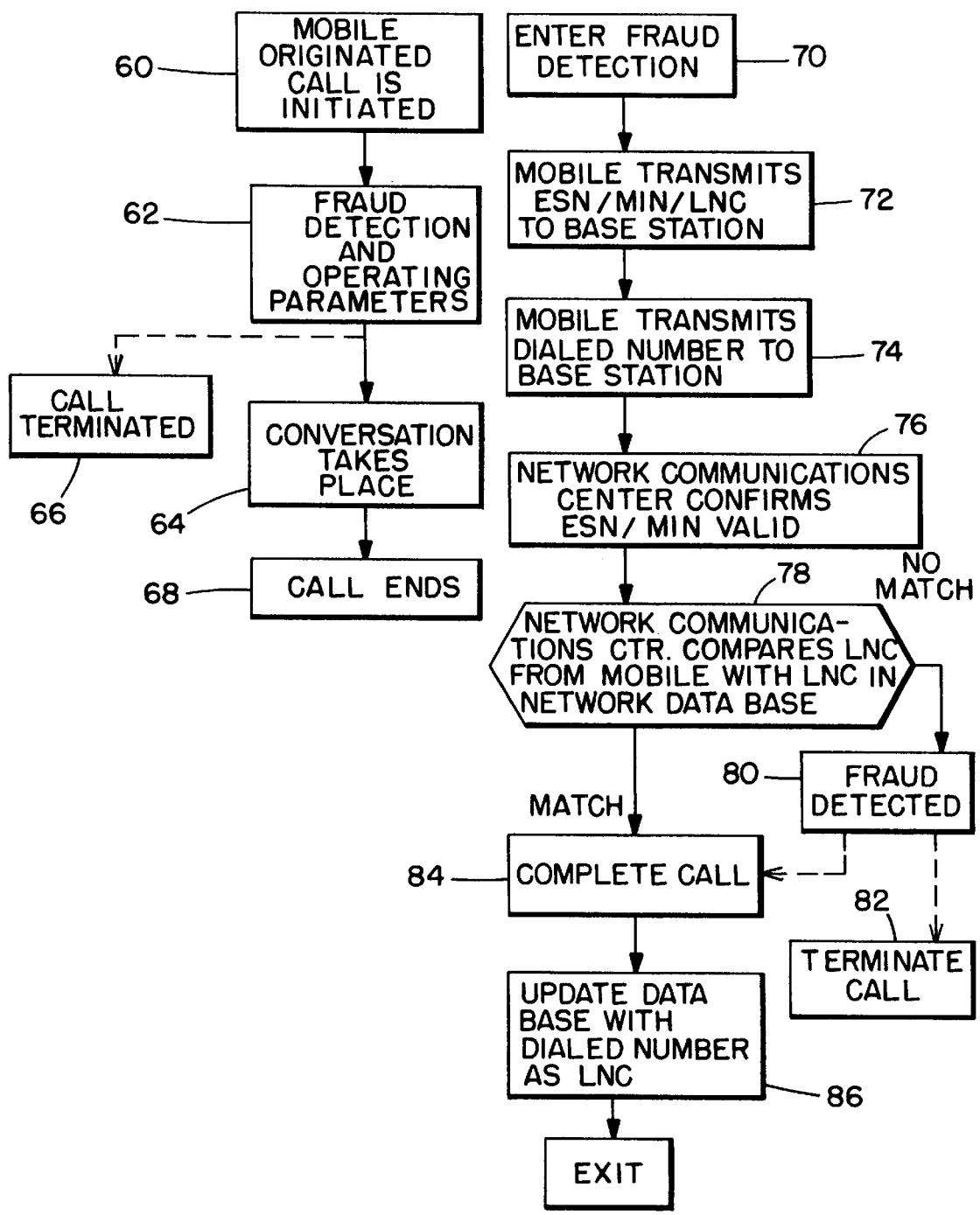

METHOD AND SYSTEM FOR DETECTION OF FRAUDULENT CELLULAR TELEPHONE USE

BACKGROUND OF THE INVENTION

1. Field of the Invention

The present invention relates to radio telephones, and more particularly to apparatus and method to detect and/or prevent unauthorized and fraudulent use of the radio telephone.

2. Description of the Background Art

Wireless, radio telephones such as mobile phones are identified by a unique mobile identification number (MIN) and a unique electronic serial number (ESN). Both these identifying characteristics are transmitted over the air between the mobile phone and the telephone systems mobile switching center, and are therefore able to be obtained by scanning equipment and illegally used in another (clone) phone with the cost being charged to the owner of the original phone.

A prior proposed solution to the illegal usage is to monitor the calling patterns for each customer's wireless calls and to block any calls that do not correspond to the customer's prior calling pattern. However, this solution may result in the blocking of calls for an authorized customer if they change their calling pattern, and it will not successfully block calls from phones that continually change the MIN-ESN that they use (so-called "tumbler-cloner" or "Magic phones". Also, typically the calling pattern can only be checked after the call is completed, at which time it is too late to prevent the fraud.

Another prior solution to the problem is to utilize the IS 54 B Cellular System Dual-Mode Mobile Station—Base Station Compatibility Standard (Rev-B). The IS 54 B standard calls for pre-call authentication of the calling wireless telephone using a "shared secret key" over a digital call set-up channel. A shared secret key is a key that is known only by the two parties involved in the authentication. This proposed solution suffers from the problems that in order to be operative it requires both cooperation and investment on the part of all the wireless carriers, such as the ability to access each other's data bases where the keys are stored and upgrading of their switching equipment to be compatible with the IS 54 B call set standard. These propositions are computationally intensive, expensive and require a long time to implement.

Still another solution is the technique described in U.S. Pat. No. 5,420,908 issued May 30, 1995 to Hodges et al. entitled METHOD AND APPARATUS FOR PREVENTING WIRELESS FRAUD. In the Hodges et al. patent the use of stolen mobile identification number (MIN) and electronic serial number (ESN) information to fraudulently place wireless calls is prevented by having the switches of multiple wireless carriers forward or direct, over a telephone connection, all calls placed from selected MINs to a central authentication platform that serves the multiple wireless carriers. The central authentication platform engages in a so-called "challenge-response" authentication with local processors that are interfaced to the wireless telephones from which non-fraudulent calls originate. The challenge-response authentication uses a shared secret key (S-Key) that is not broadcast over the air interface, thus preventing the key from being "stolen". A call from a wireless telephone that is not interfaced to a local processor capable of successfully completing the challenge-response authentication is completed to the number desired by the customer. Advantageously, since the central authentication platform serves multiple wireless carriers, the need for one wireless carrier to access the database of another is alleviated and the expense of providing additional security is reduced.

The Hodges et al. technique is another example of a "shared secret data" technique that involves intensive compilation and relies on encryption techniques having algorithms that must be maintained secret.

SUMMARY OF INVENTION

The use of stolen mobile identification number (MIN) and electronic serial number (ESN) information to fraudulently place wireless calls is detected by comparing the last phone number connected (LNC) as recorded by the radio telephone network with the last phone number connected as recorded in the mobile radio telephone unit. The mobile unit LNC is transmitted to the base station upon initiation of a radio telephone call for comparison with the LNC recorded by the radio telephone network. The network will detect if a MIN/ESN combination is in use by two different mobile units because the LNC of the two mobile units will be different due to the different phone numbers called by each user. This method provides an advantage that no secret keys are needed, the effective signature of a mobile unit changes with each phone call made, and detection of fraudulent use is available within a few phone calls.

An object of the present invention is to provide apparatus and method that uses not only the MIN and ESN but also the last number connected (LNC) by the mobile unit.

Previous fraud detection techniques are static. Once the ESN of a legitimate mobile has been stolen, the original phone has been virtually cloned with no possibility of detection until the customer receives his or her bill.

Therefore, object of the present invention is to provide a dynamically updated system of identifying a mobile. The dynamic variable is simply the last number which was dialed for which a phone call was completed by the mobile. This information is readily available both to the mobile and the base station. More significantly, it is ever changing through the regular use of the phone.

In operation, when an attempt is made by a mobile to access the system, the system would not only ask for the usual MIN/ESN combination, but also for the last number the phone dialed and connected (LNC). An intruder may manage to steal this information over the air, at the same time he steals the ESN/MIN. However, he now may only use this combination for as long as the original, legitimate user, does not make another call. Furthermore, as soon as the intruder has made a call, the first call placed by the legitimate user would trigger detection of dual usage of the same ESN. The course of action at this point could vary in severity from covert observation and localization of the intruder to outright termination of the service with a message indicating the cause of the termination. The legitimate user would probably be grateful for not having to go through the process of proving that the several thousand dollars showing up on his bill are fraudulent, while the intruder would suffer the shock of having been detected.

Other and further features, advantages and benefits of the invention will become apparent in the following description taken in conjunction with the following drawings. It is to be understood that the foregoing general description and the following detailed description are exemplary and explanatory but are not to be restrictive of the invention. The accompanying drawings which are incorporated in and constitute a part of this invention and, together with the description, serve to explain the principles of the invention in general terms.

BRIEF DESCRIPTION OF THE DRAWINGS

In the drawings:

FIGS. 2 and 3 are illustrations of flow charts for a method of fraud detection in wireless radio telephone systems according to the principles of the present invention.

DESCRIPTION OF THE PREFERRED EMBODIMENT

Figure 1:
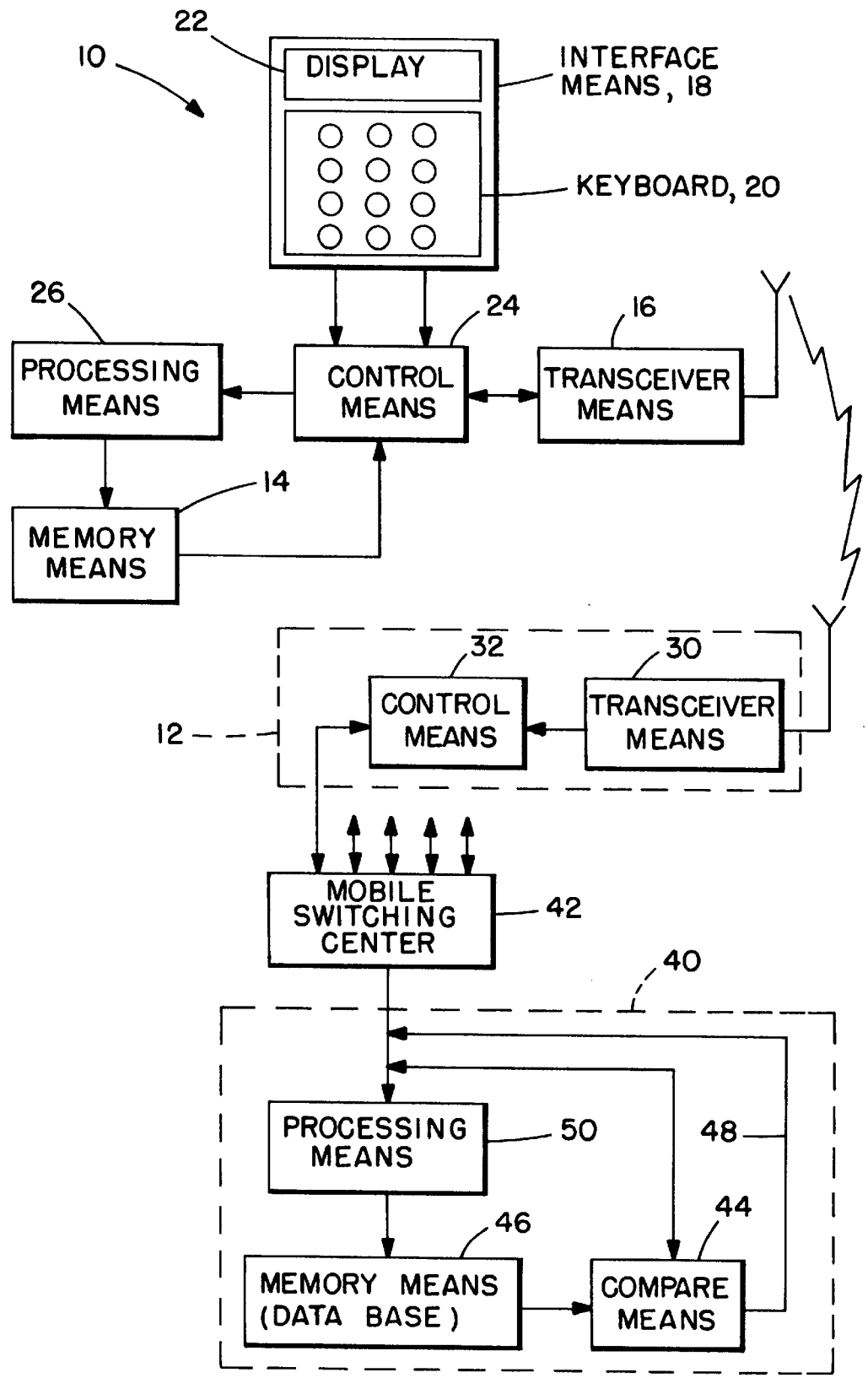
FIG. 1 is a schematic illustration of a system for the detection of fraudulent use of a wireless radio telephone according to the principles of the present invention.

Referring to FIG. 1, an illustration of an embodiment of a system for the detection of fraudulent use of a wireless telephone is provided including a mobile radio telephone system. The mobile radio telephone system comprises at least one mobile unit 10 including a memory means 14 for storing numeric data signal, a transceiver means 16 for receiving and transmitting radio telephone communications, a user interface means 18 including a keypad 20 for inputting a telephone number and a display means 22 for displaying telephone numbers and other messages and a control means 24 coupled to the user interface means 18. The control means 24 is also coupled to the transceiver means 16 for making and receiving radio telephone calls, and for transmitting the present telephone number that the user inputted. The control means 24 is further coupled to the memory means 14 for recalling and transmitting a numeric data signal representing the last telephone number dialed and connected (LNC) and which is stored in the memory means 14. Memory means 14 also has stored therein the MIN and ESN for the mobile unit 10, and the MIN and ESN is also transmitted along with the numeric data signal.

A processing means 26 is coupled to the control means 24 and to the memory means 14 for manipulating an inputted telephone number to form the numeric data signal representing the last number connected and which is stored in the memory means 14 each time a radio telephone call occurs. The at least one mobile unit 10 is connected through an air interface to at least one base station 12 that includes a transceiver means 30 for receiving and transmitting radio telephone communications and a control means 32 coupled to transceiver means 30 for making and receiving radio telephone calls. The control means 32 further receives from the transceiver means 30 the inputted telephone number and the numeric data signal (i.e. LNC) transmitted from the mobile unit 10 and received by the transceiver means 30 of base station 12 along with the MIN and ESN. An optional mobile switching center 42 is coupled to the base station for interconnecting it to all base stations in the system. A network communications means 40 is connected to mobile switching center 42. Network communication means 40, which may be located remote from base station 12, includes a memory means 44 for storing a numeric data signal, a comparing means 46 is coupled to memory means 46 and also coupled to mobile switching center 42 for comparing the numeric data signal (LNC) stored in memory means 44 and the numeric data signal (LNC) transmitted from memory means 14 of mobile unit 10 to generate a comparison signal on lead 48. A processing means 50 is also coupled to control means 32 via mobile switching center 42 and to memory means 46 for manipulating the inputted telephone number received in a radio telephone communication from the mobile unit 10 to form a new or updated numeric data signal (LNC) which is stored in memory means 46 each time a radio telephone call occurs. An unauthorized use is indicated by the comparison signal produced when the numeric data signal (LNC) stored in memory means 46 of the network communication means 40 is not the same as the numeric data signal (LNC) received from the memory means 14 of mobile unit 10 via base station 12 when a radio telephone call occurs.

When the output of comparing means 44 indicates that the two numeric data signals are not the same, the telephone call can be terminated or can be permitted to continue as desired.

Referring to FIG. 2, a flow chart illustrates the steps of the method for carrying out the present invention.

Referring to FIG. 2, an overview of the steps of the inventive method is presented in the flow chart.

In block 60 the step of originating the mobile telephone call is performed. Then, in block 62, the step of fraud detection and updating the system parameters is carried out. The novel steps of the present invention are carried out essentially in block 62. After the step of block 62 has been performed either the conversation is permitted to take place over the mobile phone (block 64) or, optionally, the call is terminated (block 66).

If the conversation takes place according to block 64, at the conclusion of the conversation the call ends (block 68).

More particularly, FIG. 3 illustrates the novel steps of the present invention. In the step of block 70 the fraud detection command is initiated. Then in the step of block 72 the mobile phone transmits the electronic serial number (ESN), the mobile identification number (MIN) and the last number connected (LNC) data to the base station transceiver means 30 of FIG. 1. In block 74 the mobile phone transmits the dialed number to the base station transceiver means 30 of FIG. 1. The ESN and the MIN are confirmed at the network communications center 40 and compare means 44 of FIG. 1 as shown in block 76 and the compare means 44 of network switching center 40 compares, as shown in block 78, the LNC received from the mobile phone with the LNC stored in the network data base in memory means 46 of FIG. 1.

If there is no match between the LNC received from the mobile phone unit 10 and the LNC from the data base of memory means 46, then the "fraud detected" step of block 80 is carried out and, optionally, the call may be terminated (block 82) or proceed to complete the call (block 84).

If there is a match between the LNC from the mobile phone unit 10 and the LNC from the data base of memory means 46, then the "complete the call" step of block 84 is carried out.

In block 86, the data base stored in memory means 46 is updated with the LNC of the dialed number transmitted from mobile phone unit 10 in block 74.

Thus, upon the occurrence of another use of the mobile phone unit 10 with a new dialed number, the previously dialed (connected) number is now the LNC stored in the data base of memory means 46.

While the invention has been described in connection with a preferred embodiment, it is not intended to limit the scope of the invention to the particular form set forth, but, on the contrary, it is intended to cover such alternatives, modifications, and equivalence as may be included within the spirit and scope of the invention as defined in the appended claims.

What is claimed is:

1. A detection system for detecting the unauthorized use of a mobile radio telephone unit comprising:

at least one mobile radio telephone unit including:
- a first memory means for storing first numeric data representative of a last telephone number connected (LNC);
- a first transceiver means for receiving and transmitting radio telephone communications;
- a first control means;
- a user interface means connected to said first control means for inputting a telephone number by a user;
- said first control means coupled to said first transceiver means for making and receiving radio telephone calls, and transmitting said inputted telephone number from said user interface means, said first control means further coupled to said first memory means for recalling and transmitting said first numeric data representing a last telephone number connected (LNC) and stored in said first memory means;
- a first processing means coupled to said first control means and to said first memory means for and responsive to said inputted telephone number from said user interface means and stored in said first memory means to form said first numeric data representing a last telephone number connected (LNC) each time a radio telephone call occurs;
- a radio telephone network including
  - at least one base station including:
    - a second transceiver means for receiving and transmitting radio telephone communications;
    - a second control means coupled to said second transceiver means for making and receiving radio telephone calls, said second control means further receiving from said second transceiver means said inputted telephone number and said first numeric data (LNC) transmitted from said at least one mobile radio telephone unit and received by said second transceiver means;
    - a network communication means, coupled to said second control means, for connecting said at least one base station to said radio telephone network, said network communication means including:
      - a second memory means for storing second numeric data representative of the last telephone number connected (LNC);
      - a comparing means coupled to said second memory means and to said second control means for comparing said second numeric data (LNC) stored and said first numeric data (LNC) received to generate a comparison signal;
      - a second processing means coupled to said second control means and to said second memory means and responsive to said inputted telephone number received from said at least one mobile radio telephone unit to form said second numeric data (LNC) which is stored in said second memory means each time a radio telephone call occurs
      - wherein unauthorized use of said at least one mobile radio telephone unit is indicated by said comparison signal when said second numeric data (LNC) stored in said network communication means is not the same as said first numeric data (LNC) received from said at least one mobile radio telephone unit when a radio telephone call occurs.

2. A detection system according to claim 1 wherein said radio telephone network includes a plurality of said base stations and a mobile switching center means coupled to said second control means of each of said base stations for connecting said plurality of base stations to each other.

3. A detection system according to claim 2 wherein said detection system includes a plurality of said mobile radio telephone units each having stored therein separate, unique mobile identification number (MIN) data and electronic serial number (ESN) data, and wherein said MIN and ESN data is transmitted with said first numeric data (LNC).

4. A detection system according to claim 1 wherein said user interface includes an alpha-numeric keypad for inputting said telephone number by said user and a display means for displaying alpha-numeric messages including telephone numbers.

5. A detection system according to claim 1 further including means responsive to the output of said comparing means for terminating said radio telephone call when said second numeric data (LNC) stored is not the same as said first numeric data (LNC) stored.

6. A method of detecting the unauthorized use of a mobile radio telephone comprising the steps of:
- (Step 1) Receiving at a mobile radio telephone network communications center a request for wireless telephone communication from a mobile radio telephone unit said request including a particular mobile identification number (MIN) data and electronic serial number (ESN) data for the mobile unit and last number connected (LNC) data from the mobile unit,
- (Step 2) Receiving from the mobile unit a telephone number entered by a user;
- (Step 3) Comparing said LNC data received from the mobile unit with LNC data previously stored in the network communications center for the mobile unit having said particular MIN/ESN data;
- (Step 4) Responding to a difference indicated by the Step 3 of comparing said LNC data received and said LNC data stored to indicate an unauthorized use of said mobile units.

7. A method of detecting the unauthorized use of a mobile radio telephone unit according to claim 6 further including the steps of:
- (Step 5) Processing in the network communications center said telephone number entered by the user and received from said mobile unit to create a new LNC data;
- (Step 6) Storing in the mobile switching center said new LNC data created from the telephone number entered by the user and received from said mobile unit;
- (Step 7) Processing in said mobile unit the telephone number entered by said user to create said new LNC data;
- (Step 8) Storing in the mobile unit the new LNC data created from the telephone number entered by the user.

8. A method of detecting the unauthorized use of a mobile radio telephone unit according to claim 6 wherein step 3 further includes confirming as valid the MIN data and the ESN data received from said mobile unit.

* * * * *